US010742661B2

(12) United States Patent
Allo et al.

(10) Patent No.: US 10,742,661 B2
(45) Date of Patent: *Aug. 11, 2020

(54) VIRTUALIZED VOLUME LEVEL MESSAGING

(71) Applicant: Seagate Technology LLC, Cupertino, CA (US)

(72) Inventors: Christopher N. Allo, Lyons, CO (US); Richard O. Weiss, Superior, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/432,657

(22) Filed: Feb. 14, 2017

(65) Prior Publication Data

US 2018/0234432 A1     Aug. 16, 2018

(51) Int. Cl.
G06F 21/00          (2013.01)
H04L 29/06          (2006.01)

(52) U.S. Cl.
CPC .......... H04L 63/123 (2013.01); H04L 63/061 (2013.01)

(58) Field of Classification Search
CPC .... H04W 12/08; H04L 63/10; H04L 63/0464; H04L 9/14; G06F 21/602; G06F 21/6218
USPC ........................................................ 713/170
See application file for complete search history.

(56) References Cited

U.S. PATENT DOCUMENTS

| 8,654,971 | B2 | 2/2014 | Orsini et al. |
| 8,713,633 | B2 | 4/2014 | Thomas |
| 9,064,127 | B2 | 6/2015 | O'Hare et al. |
| 9,213,857 | B2 | 12/2015 | O'Hare et al. |
| 9,864,874 | B1* | 1/2018 | Shanbhag ............ G06F 21/6218 |
| 10,102,356 | B1* | 10/2018 | Sahin ....................... G06F 21/31 |
| 10,372,926 | B1* | 8/2019 | Leshinsky ............ G06F 21/6218 |
| 2005/0144404 | A1* | 6/2005 | Nashimoto ........... G06F 3/0607 711/154 |
| 2008/0082836 | A1* | 4/2008 | Osaki ...................... G06F 21/62 713/193 |
| 2008/0114980 | A1 | 5/2008 | Sridhar |
| 2009/0268903 | A1* | 10/2009 | Bojinov ................. G06F 3/0622 380/45 |
| 2011/0252237 | A1* | 10/2011 | PalChaudhuri ....... H04L 9/3226 713/168 |
| 2012/0239943 | A1* | 9/2012 | Okamoto ............. G06F 21/6218 713/193 |
| 2013/0148810 | A1 | 6/2013 | Goel |
| 2014/0164790 | A1* | 6/2014 | Dodgson ................. G06Q 10/10 713/193 |
| 2015/0249687 | A1 | 9/2015 | O'Hare et al. |
| 2016/0034721 | A1* | 2/2016 | Moriguchi .......... G06F 21/6218 713/193 |
| 2016/0080323 | A1 | 3/2016 | MacKay et al. |
| 2016/0275303 | A1 | 9/2016 | Narayanaswamy et al. |
| 2016/0379005 | A1 | 12/2016 | O'Hare et al. |
| 2017/0288863 | A1* | 10/2017 | Dimitrakos ......... G06F 21/6209 |

\* cited by examiner

Primary Examiner — Shewaye Gelagay
Assistant Examiner — Kevin Ayala
(74) Attorney, Agent, or Firm — Holzer Patel Drennan (57) ABSTRACT

Implementations and methods herein provide a networked storage system including a plurality of physical storage devices configured to store data on a plurality of virtualized volumes, a key store configured to store a plurality of encryption keys, and a secure messaging manager configured to encrypt a message to each of the plurality of virtualized volumes using a different encryption key.

14 Claims, 5 Drawing Sheets

VIRTUALIZED VOLUME LEVEL MESSAGING

CROSS-REFERENCE TO RELATED APPLICATION

This application is related to and incorporates in its entirety, U.S. Non-Provisional patent application Ser. No. 15/432,657 entitled "Virtualized Volume Level Security" and filed concurrently on 14 Feb. 2017.

BACKGROUND

Cloud data security schemes can employ a variety of techniques to protect data. Such techniques may include data encryption and user authentication. Both encryption and authentication may employ the use of keys to provide increased security. For example, a key may be used to encrypt data, or a key may be used to authenticate a user requesting access to network resources. The key may be shared among multiple users or devices.

SUMMARY

Implementations and methods herein provide a networked storage system including a plurality of physical storage devices configured to store data on a plurality of virtualized volumes, a key store configured to store a plurality of encryption keys, and a secure messaging manager configured to encrypt a message to each of the plurality of virtualized volumes using a different encryption key.

An alternative implementation provides a networked storage system including a plurality of physical storage devices configured to store data on a plurality of virtualized volumes, a key store configured to store a plurality of encryption keys, and a secure messaging manager configured to encrypt a message to each of the plurality of virtualized volumes using a different encryption key, wherein the secure messaging manager is further configured to receive the encryption key from a client.

Another implementation provides a networked data storage system including a plurality of virtualized volumes, messaging with each of the plurality of virtualized volumes being encrypted using a different key.

These and various other features and advantages will be apparent from a reading of the following Detailed Description.

DETAILED DESCRIPTION

In the following description, for the purposes of explanation, numerous specific details are set forth in order to provide a thorough understanding of the various implementations described herein. While various features are ascribed to particular implementations, it should be appreciated that the features described with respect to one implementation may be incorporated with other implementations as well. By the same token, however, no single feature or features of any described implementation should be considered essential, as other implementations may omit such features.

As more and more data is stored remotely (e.g., in the cloud) rather than locally (e.g., a user device), data security is increasingly important. Cloud security schemes can employ a variety of techniques to protect data, such as encryption, authorization, password systems, etc. Data encryption generally involves the transformation of input data into an encrypted output using a selected cryptographic algorithm, function or operation. The algorithm/function may utilize one or more keys to effect the transformation from input data (e.g., plain text) to output data (e.g., cypher text). If encrypted data is to be sent from a first user/device to a second user or device, then the second user or device must have knowledge of the one or more keys to decrypt the data such that it may be utilized.

In secure storage systems, message security schemes are enforced at the storage device level in a variety of ways. For example, a user may first require authentication before the user is allowed access to the secure storage systems. Multi-device storage systems may provide large scale storage capabilities in a distributed computing environment (e.g., cloud based object storage systems, RAID storage system, large database processing systems, etc.). Multi-device storage systems may utilize encrypted data at the storage device level and authentication passwords that can be used between the storage device and a host to identify and authenticate a data exchange.

Implementations of the virtualized volume level messaging system disclosed herein provide the ability to protect the messaging with volumes or logical unit numbers (LUNs) and its associated data where each volume may be virtualized in that its associated data is split among many drives. Specifically, the messaging between a virtualized volume secure messaging manager and drives that store one or more sections of the virtualized volumes are secured using encryption keys where each channel between the virtualized volume secure messaging manager and a drive uses a different encryption key compared to other such channels.

One or more implementations disclosed herein provide for secure messaging with virtualized volume levels where each virtual volume of data on a server, such as a cloud server, uses a different key for messaging with that volume and one or more SEDs that store data for that volume. Thus, for example, a cloud server may be implemented using ten different physical storage drives and contain two virtual volumes spread across the ten different physical storage devices. In such a case, the messaging with a first logical volume is encrypted using a first key and the messaging with a second volume is encrypted using a second key, with the first key being different than the second key.

An implementation of such secure virtualized volume messaging system allows for protective messaging to be established between all parts—from the virtualized volume secure messaging manager down to self-encrypting drives (SEDs). In one implementation, secure messaging between the virtualized volume secure messaging manager and the SED may be implemented using pre-shared keys (PSKs). In another implementation, secure messaging between the virtualized volume secure messaging manager and the SEDs may be implemented using certificate (CERT) passing. Furthermore, the SEDs are configured to support the CERT passing technology.

In one implementation using the PSKs, a set of keys may be sent to an SED in a preliminary handshake for initialization of secure messaging. The PSKs may be self-generated at a key store attached to the virtualized volume secure messaging manager or alternatively the PSKs may be requested from a remote key management server (KMS). Once the set of keys are loaded onto an SED, that SED is ready for use of messaging in a secure environment.

In an implementation using CERT passing, the initialization if the CERTs is done via a standardized certificate setup to the SED. Such an implementation assumes that the SEDs have the CERTs installed on them. As the virtualized volume secure messaging manager communicates with the virtualized volumes and the virtualized volumes communicate with the SEDs, a handshake may be done to establish secure communication.

Once the handshake is established, all further communication uses the chosen PSKs or the CERTs. By securing the communications to the SEDs with either of these methods encrypts all messages between the virtualized volume secure messaging manager and the SEDs. This ensures that a third party cannot intercept such messages between the virtualized volume secure messaging manager and the SEDs and get any information such as authentication keys, drive set up commands, drive delete commands, etc. In such an implementation, any message that is sent between the SEDs and the virtualized volume secure messaging manager without a chosen PSK or a chosen CERT is discarded.

The system disclosed herein using virtualized volume level secure messaging, each of the virtualized volumes may be controlled by a volume controller. For example, such volume controller may be configured on a network based server and it may be configured to communicate with client devices and with storage devices where the volume is virtualized. In one implementation, such volume controller also communicates with the client devices and/or with the data storage systems using the PSK or the CERTs.

In an alternative implementation of the system providing virtualized volume level secure messaging, messaging to each virtual volume is controlled using a different key. Thus, for example a cloud server may be implemented using twenty different physical storage drives and contain two virtual volumes spread across the ten different physical storage devices with a storage controller configured to access the data on the cloud server. In such a case, messages between the storage controller and the first volume may be controlled using a first key and the messages between the storage controller and the second volume may be controlled using a second key, with the first key being different than the second key.

Figure 1:
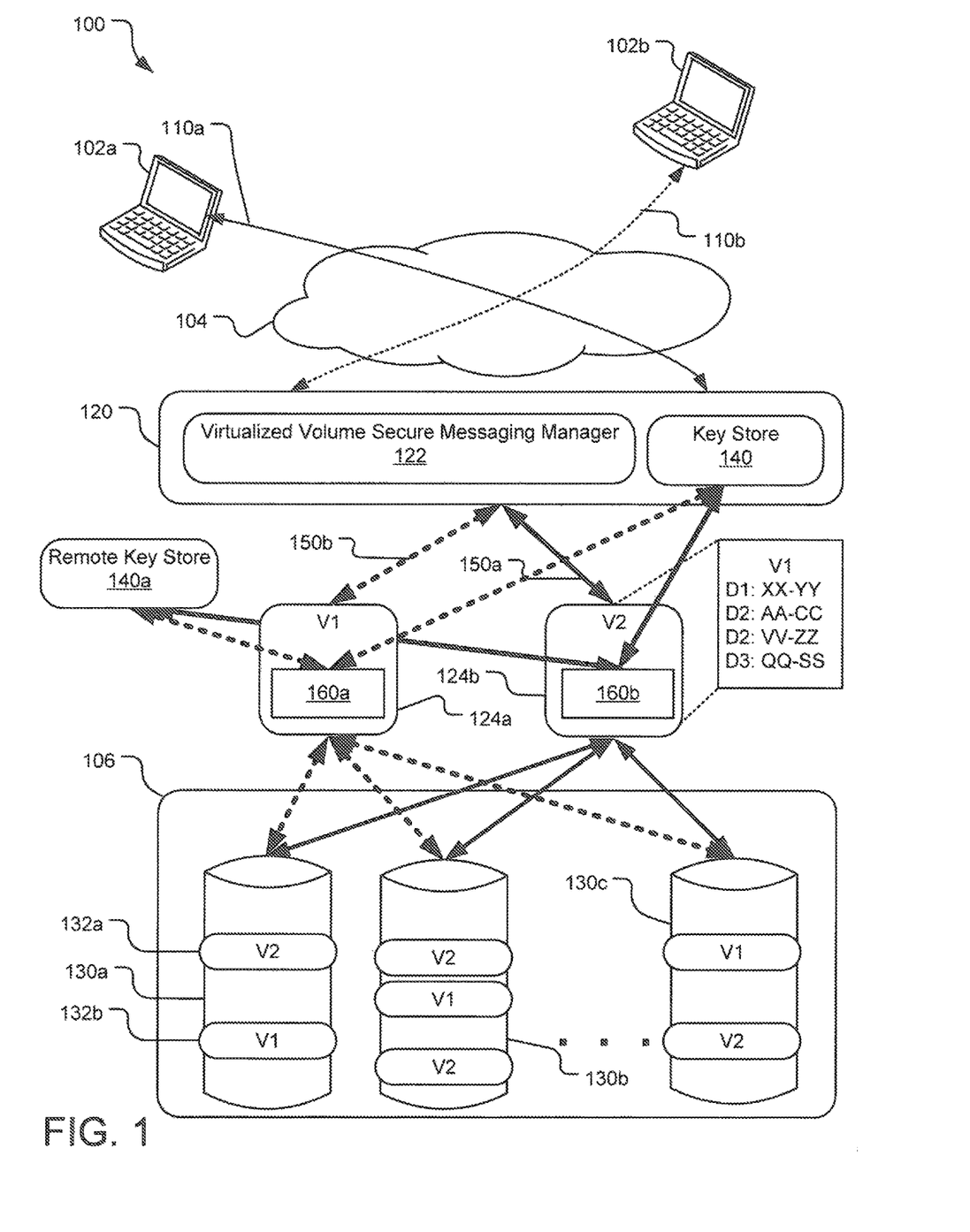
FIG. 1 illustrates an example implementation of a networked storage system using virtualized secure messaging structure disclosed herein.

FIG. 1 illustrates an example implementation of a networked storage system 100 using a virtualized security structure disclosed herein. Specifically, the networked storage system 100 includes a number of user devices 102 configured use a network 104 to access data on a remote data storage system 106. The remote data storage system 106 may be, for example, a cloud server that can be accessed by the network 104 such as the Internet. In an implementation disclosed herein, the remote data storage system 106 may include a plurality of physical storage device such as drives 130 (130a, 130b, 130c, etc.). The drives 130 may be implemented using storage devices such as magnetic disc drives, optical disc drives, tape drives, flash drives, solid-state storage device, etc. In one implementation of the networked storage system 100, the drives 130 may be self-encrypted drives (SED).

The networked storage system 100 includes a storage access controller 120 that may be used to control access to data on a remote data storage system 106. In one implementation, the storage access controller 120 may be implemented on a same server or cloud that hosts the remote data storage system 106. However, in an alternative implementation, the storage access controller 120 may be implemented on a different server or cloud compared to the server that hosts the remote data storage system 106.

In the illustrated implementation of the networked storage system 100, the remote data storage system 106 is configured to use virtualized volumes for storing data on the drives 130. For example, at least two of the virtualized volumes V1 124a and V2 124b are illustrated herein. The virtualized volumes V1 124a and V2 124b may also be referred to as logical unit numbers (LUNs). As illustrated, each of the virtualized volumes 124 are mapped to one or more of the drives 130. For example, the Volume V2 124b is illustrated to be mapped to a storage area XX-YY of drive 130a, to two storage areas AA-CC and VV-ZZ of drive 130b, and to a storage area QQ-SS of the drive 130c. The storage access controller 120 may store and update such mapping. In an implementation of the networked storage system 100, the virtualized volumes 124 may be thinly provisioned in that each of the virtualized volumes 124 may have larger virtual storage capacity than the physical storage capacity of the drives 130.

In one implementation, the storage access controller 120 may be configured to allocate one virtualized volume to one client. Thus, for example, a client represented by the user 102b may be allocated volume V2 124b. In such implementation, communications 110a from the user device 102a are directed to volume V2 124b. Similarly, communications 110b from the user device 102b may be directed to volume V2 124a. Thus, data from a client may be dispersed among more than one of the drives 130. On the other hand, each of the drives 130 may store data from more than one client. Such virtualized allocation of data over a plurality of devices may make the data on the drives 130 vulnerable to a number of security threats. For example, a client A using the user device 102a may store corrupted data on a storage region XX-YY of the drive 130a such that the corrupted data may affect data from a client B stored on drive 130a.

In an implementation of the networked storage system 100, the storage access controller 120 also includes a virtualized volume secure messaging manager 122 (referred to hereinafter as the "secure messaging manager" 122) that assigns a different key for messaging with each one of the volumes 124. The secure messaging manager 122 may work with a key store 140 configured on the storage access controller 120 to generate encryption keys. The key store 140 may be used to generate encryption keys that may be used to encrypt messaging with the volumes 124. The key store 140 may be locally implemented on the storage access controller 120 or alternatively it may be implemented externally to the storage access controller 120. The implementation discloses such a remote key store 140a that may be implemented on a remote data server. In such an implementation, the virtualized volume secure messaging manager 122 may make calls to the remote key store 140a to create and retrieve keys that may be tied to devices 124a, 124b, etc.

In one implementation, communications between the secure messaging manager 122 and the volumes 124 are encrypted. Thus, for example, as data or messages are communicated between the secure messaging manager 122 and any of the volumes 124, such data or messages are encrypted. Furthermore, communication per each volume uses a different encryption key. As an example, a message 150b between the secure messaging manager 122 to a volume V1 124a is encrypted using a first encryption key whereas a message 150a between the secure messaging manager 122 to a volume V2 124b is encrypted using a second encryption key, the second encryption key being different than the first encryption key. In one implementation, the encryption keys to encrypt the messages 150a, 150b, etc., may be stored in a key store 140 that is located on the storage access controller 120. Alternatively, these encryption keys may also be stored on a remote key store 140a that may be implemented on a remote data server. In such an implementation, the virtualized volume secure messaging manager 122 may make calls to the remote key store 140a to create and retrieve keys that may be used to encrypt the messages 150a, 150b, etc.

Furthermore, each of the volumes 124 may have an encryption/decryption module that decrypts the messages coming from the secure messaging manager 122 and encrypts the messages going to the security manager 122. For example, the message 150b coming from the secure messaging manager 122 may be encrypted using the first key a first encryption/decryption module 160a residing on the volume V1 124a may have access to the key store 140 so that it can access the first key to decrypt the message 150b. However, in such an implementation, any other volumes, such as the volume V2 124b, does not have access to the first key and therefore, they are not able to decrypt the message 150b.

Similarly, any operations performed on the volume V2 124b, including messages going to the volume V2 124b, are encrypted using a second key such that only the volume V2 124b is able to decrypt these messages. In such an implementation, the volume V2 124b may also have a second encryption/decryption module 160b residing thereon with access to the key store 140 such that it is able to decrypt messages coming from the secure messaging manager 122 directed to encryption/decryption module 160b and to encrypt messages communicated to the secure messaging manager 122.

Figure 2:
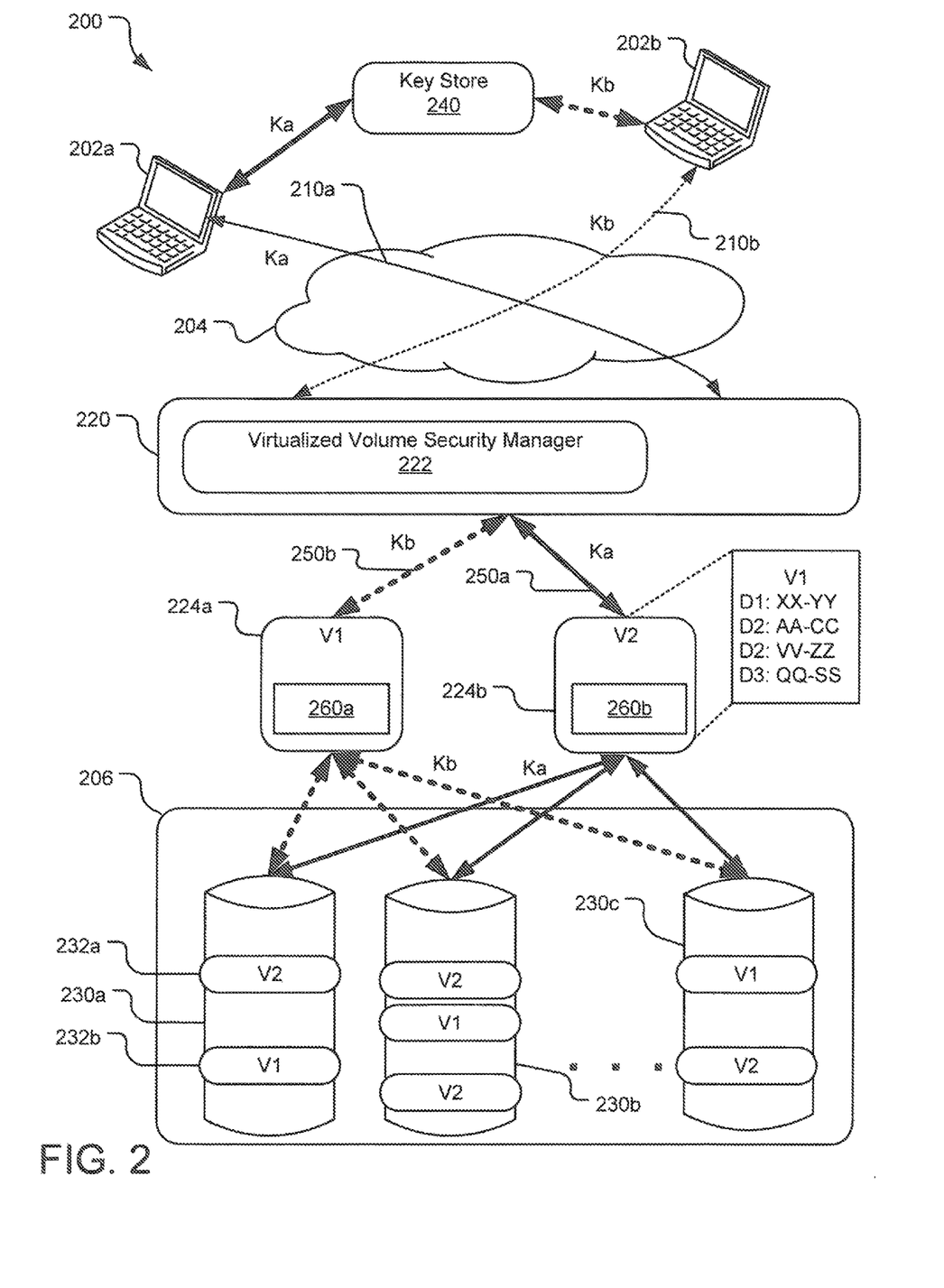
FIG. 2 illustrates another example implementation of a networked storage system using virtualized secure messaging structure disclosed herein.

FIG. 2 illustrates another example implementation of a networked storage system 200. One or more of the various components of the networked storage system 200 may be substantially similar to one or more components of the networked storage system 100. Therefore, not each component of the networked storage system 200 may be discussed in detail herein. The networked storage system 200 allows secure communication capabilities between a virtualized volume secure messaging manager 222 and various virtualized volumes 224.

Specifically, the networked storage system 200 provides an end to end data encryption system wherein a client that is allocated to a virtualized volume controls the key for encryption and decryption of messages related to that virtualized volume. For example, a communication 210a from a client 202a is communicated to a storage access controller 220 with an encryption key Ka and a secure messaging manager 222 of the storage access controller 220 communicates with a virtualized volume V2 224b using the same key Ka. Unless the virtualized volume V2 224b receives the key Ka, it does not provide access to the client 202a. The client 202 may receive the key Ka from a key store 240. Similarly, a communication 210b from a client 202b is communicated to a storage access controller 220 with an encryption key Kb and a secure messaging manager 222 of the storage access controller 220 communicates with a virtualized volume V1 224a using the same key Kb. Unless the virtualized volume V1 224a receives the key Kb, it does not provide access to the client 202b.

An alternative implementation of the networked data storage system 200 provides a CERT based encryption system in which a CERT authority uses an ID-based cryptography to produce a CERT at the client level. In such an implementation, the clients 202 have to provide such CERT with any requests to the secure messaging manager 222 for access to any of the volumes 224. As a result, access to each of the particular volumes 224 is restricted to only those clients that can provide a CERT that is used to authorize access to that particular volume. Such system provides an end to end CERT based communication where unless a client provides a CERT that is produced based on its ID, it does not have access to data on a given virtualized volume that is allocated to such a client.

Figure 3:
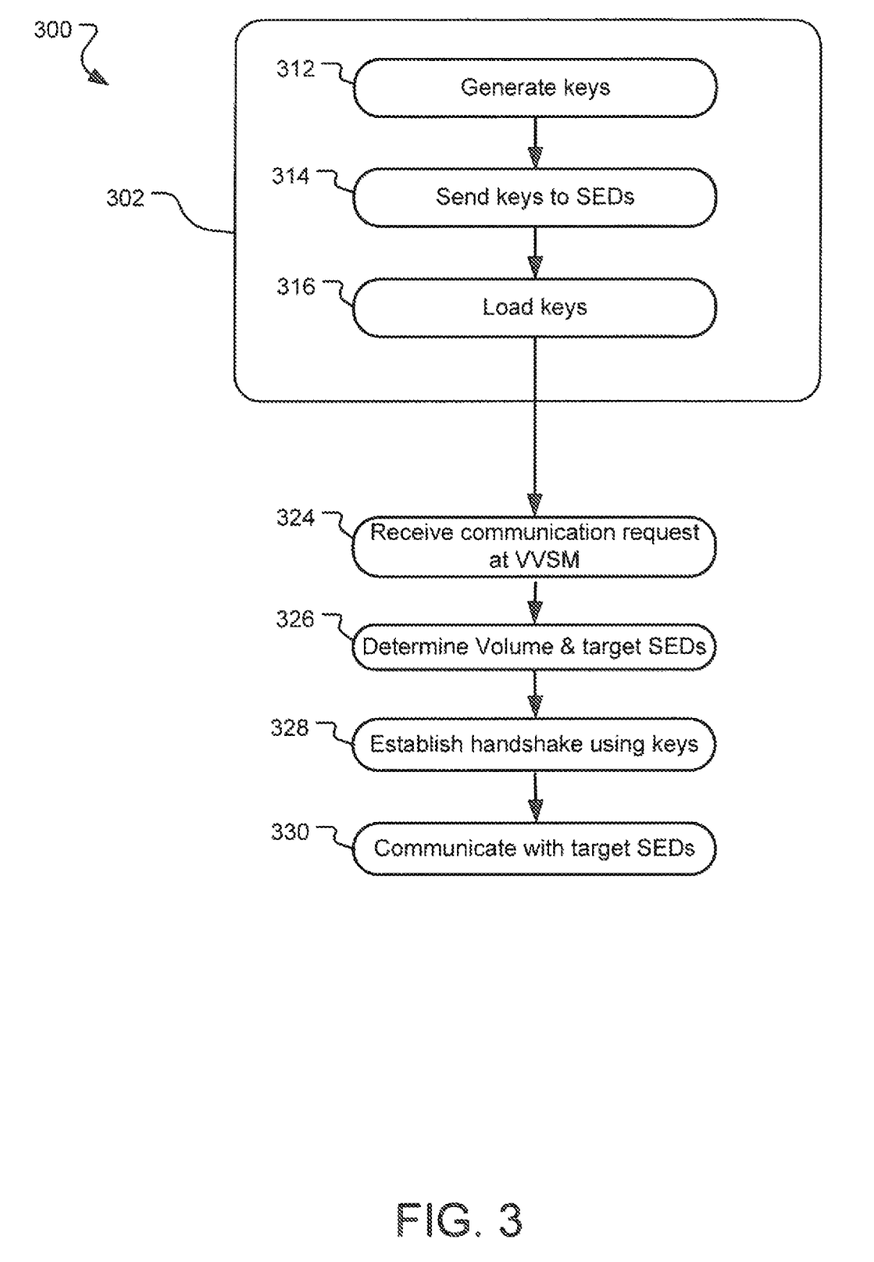
FIG. 3 illustrates example operations for using the networked storage system using the secure messaging technology disclosed herein.

FIG. 3 illustrates example operations 300 for using the networked storage system disclosed herein using PSKs. Specifically, the operations 300 may be implemented by a virtualized volume security manager such as those described herein. Initially, operations 302 establish a handshake between a virtualized volume secure messaging manager and various SEDs. Specifically, an operation 312 generates PSKs that will be used to communicate between the virtualized volume secure messaging manager and the SEDs. Such PSKs may be generated locally or remotely. An operation 314 sends the keys to the SEDs and an operation 316 loads these keys in the SEDs.

An operation 324 receives a request for accessing a networked resource, such as a cloud server having various virtualized volumes. For example, the operation 324 receives a request, such as a request from a client device connected with the secure messaging manager via the Internet. A determining operation 326 determines which of the various volumes is the target of the data storage request as well as various target SEDs associated with such volume.

For example, the network resource may be a cloud storage system with ten drives and one hundred virtualized volumes implemented on the ten drives such as way that each volume may be allocated storage area on one or more of the ten drives. The operation 326 may determine that the target volume level is a volume A of the one hundred volumes. An operation 328 establishes a handshake between the virtualized volume secure messaging manager and the target SEDs using the keys established during the handshake operations 302. Subsequently, at operation 330 the virtualized volume secure messaging manager communicates with the target SEDs.

Figure 4:
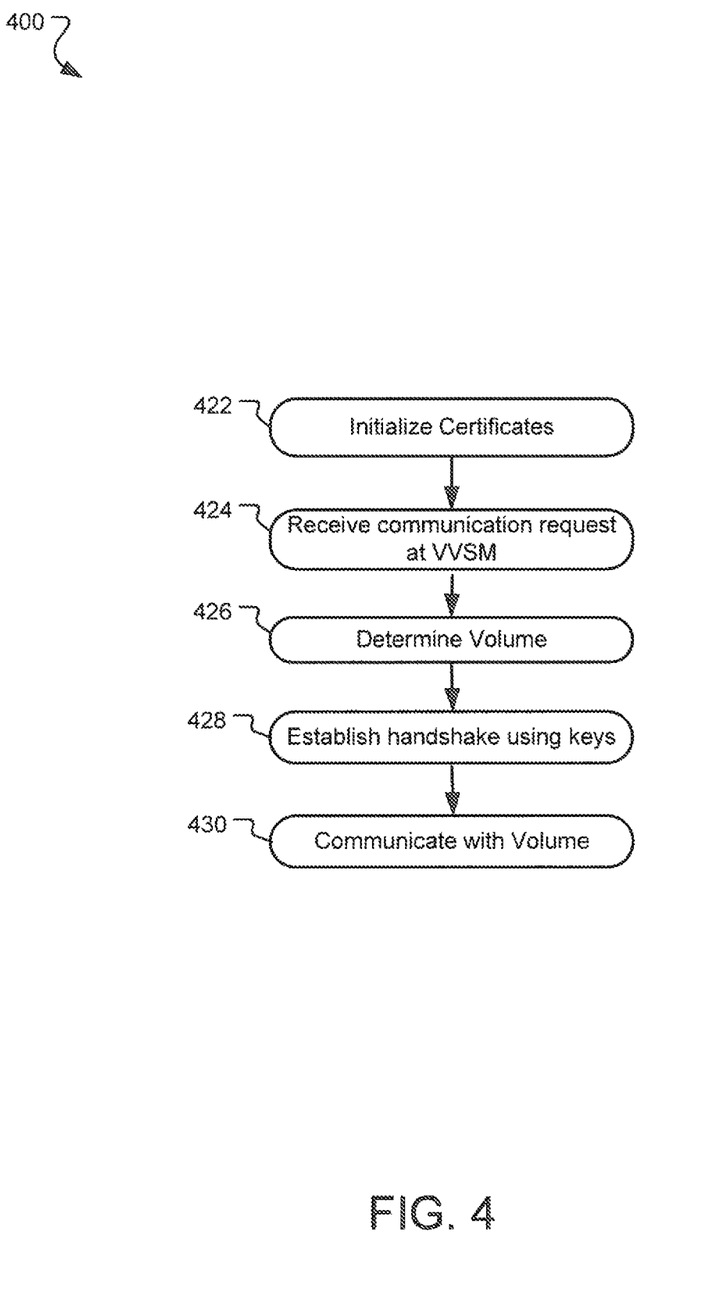
FIG. 4 illustrates alternate example operations for using the networked storage system using the secure messaging technology disclosed herein.

FIG. 4 illustrates example operations 400 for using the networked storage system disclosed herein using CERTs. Specifically, the operations 400 may be implemented by a virtualized volume security manager such as those described herein. Initially, operations 422 establish a handshake between a virtualized volume secure messaging manager and various SEDs using the CERTs. For example, it may be assumed that the CERTs are already installed on the SEDs.

An operation 424 receives a request for accessing a networked resource, such as a cloud server having various virtualized volume. For example, the operation 424 receives a request, such as a request from a client device connected with the secure messaging manager via the Internet. A determining operation 426 determines which of the various volumes is the target of the data storage request as well as various target SEDs associated with such volume.

For example, the network resource may be a cloud storage system with ten drives and one hundred virtualized volumes implemented on the ten drives such as way that each volume may be allocated storage area on one or more of the ten drives. The operation 426 may determine that the target volume level is a volume A of the one hundred volumes. An operation 428 establishes a handshake between the virtualized volume secure messaging manager and the target SEDs using the CERTs established during the handshake operations 422. Subsequently, at operation 430 the virtualized volume secure messaging manager communicates with the target SEDs.

Figure 5:
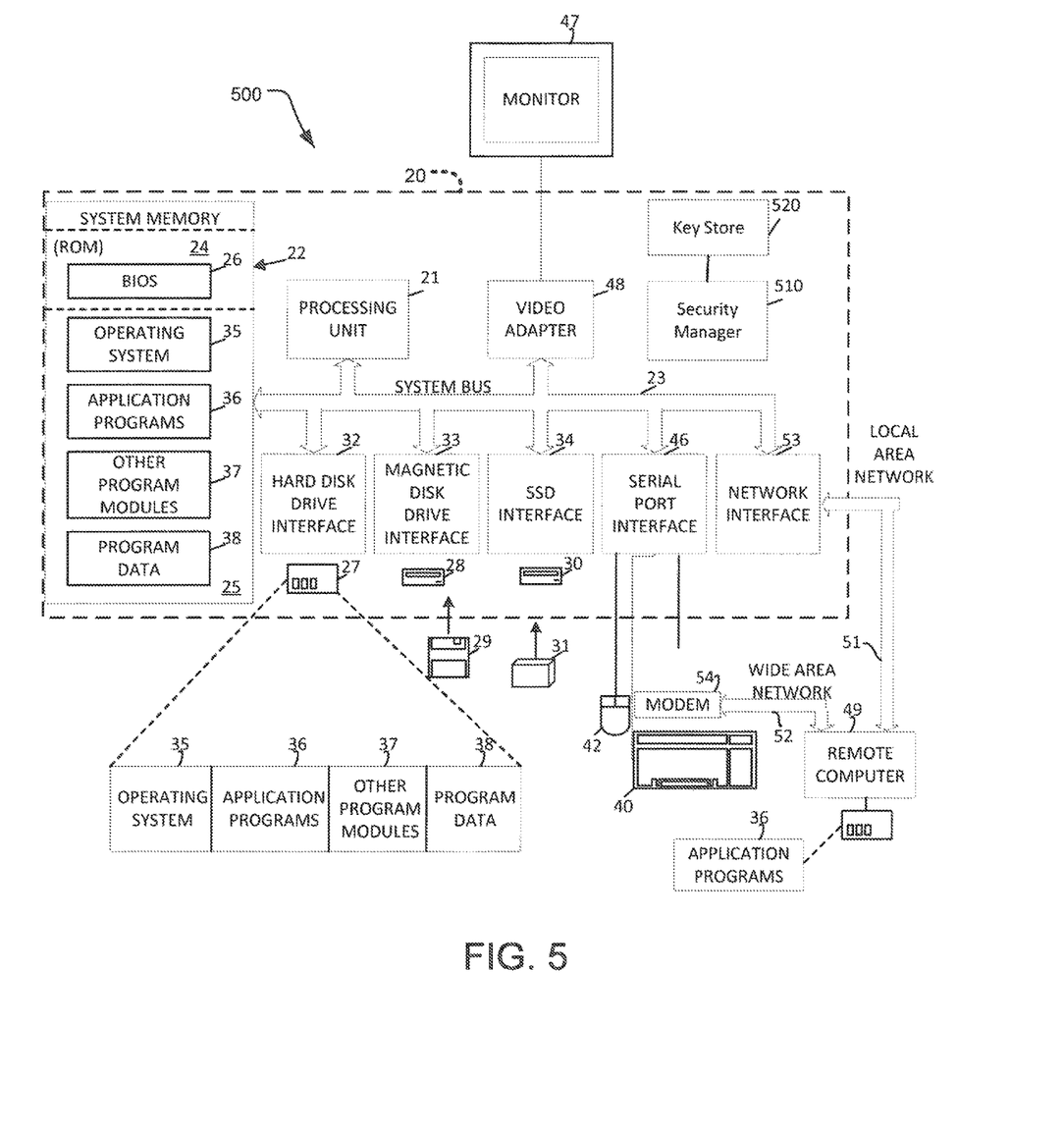
FIG. 5 illustrates example computing device for implementing the virtualized volume level secure messaging system disclosed herein.

FIG. 5 illustrates an example computing system 500 that may be useful in implementing the volume lever security system disclosed herein. The example hardware and operating environment of FIG. 5 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 5, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

In the example implementation of the computing system 500, the computer 20 also includes a secure messaging manager 510, such as the virtualized volume secure messaging manager disclosed herein. The secure messaging manager 510 may communicate with key store 520 to control access to one or more virtualized volumes.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory, and includes read-only memory (ROM) 24 and random access memory (RAM) 25. A basic input/output system (BIOS) 26, contains the basic routines that help to transfer information between elements within the computer 20, such as during start-up, is stored in ROM 24. The computer 20 further includes a hard disk drive 27 interface for reading from and writing to a hard disk, not shown, a magnetic disk drive 28 interface for reading from or writing to a removable magnetic disk 29, and a solid state disk drive interface 34 for reading from or writing to a solid state disc disk 30.

The computer 20 may be used to implement a volume lever security system disclosed herein. In one implementation, a frequency unwrapping module, including instructions to unwrap frequencies based on the sampled reflected modulations signals, may be stored in memory of the computer 20, such as the read-only memory (ROM) 24 and random access memory (RAM) 25, etc.

Furthermore, instructions stored on the memory of the computer 20 may be used to perform one or more operations disclosed in FIG. 4. Similarly, instructions stored on the memory of the computer 20 may also be used to implement one or more components of FIGS. 1-3. The memory of the computer 20 may also one or more instructions to implement the volume level security system disclosed herein.

The hard disk drive 27, magnetic disk drive 28, and the solid state disk drive 30 are connected to the system bus 23 by a hard disk drive interface 32, a magnetic disk drive interface 33, and a solid state disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, external solid state disk drive 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software or firmware instructions for the power secure messaging manager 510 may be stored in system memory 22 and/or storage devices 29 or 31 and processed by the processing unit 21. One or more instructions for virtualized volume level security scheme and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A networked storage system comprising:
    a plurality of physical storage devices configured to store data on a plurality of virtualized volumes, the virtualized volumes being distributed across two or more of the plurality of physical storage devices;
    a key store configured to store a plurality of encryption keys; and
    a secure messaging manager configured to:
        encrypt a message to each of the plurality of virtualized volumes using a different encryption key for each of the plurality of virtualized volumes,
        receive a request from a client for communication with one of the plurality of virtualized volumes,
        determine an encryption key used to encrypt data to the one of the plurality of virtualized volumes,
        request the encryption key from the key store used to encrypt data to the one of the plurality of virtualized volumes from the key store, and
        encrypt the message to the one of the plurality of virtualized volumes with the encryption key,
        wherein messages sent between a first of the plurality of virtualized volumes and a first of the two or more physical storage devices are encrypted using a first of the plurality of encryption keys, and wherein messages sent between the first of the plurality of virtualized volumes and a second of the two or more physical storage devices are also encrypted using the first encryption key.

2. The networked storage system of claim 1 wherein the key store is a local key store configured with the secure messaging manager.

3. The networked storage system of claim 1, wherein the key store is configured remotely from the secure messaging manager.

4. A networked storage system, comprising:
    a plurality of physical storage devices configured to store data on a plurality of virtualized volumes, the virtualized volumes being distributed across two or more of the plurality of physical storage devices;
    a key store configured to store a plurality of encryption keys, wherein the plurality of encryption keys of the key store is a plurality of public keys and each of the plurality of virtualized volumes has a private key corresponding to the related one of the plurality of public keys; and
    a secure messaging manager configured to encrypt a message to each of the plurality of virtualized volumes using a different encryption key for each of the plurality of virtualized volumes, wherein the secure messaging manager is further configured to receive the encryption key from a client, wherein messages sent between a first of the plurality of virtualized volumes and a first of the two or more physical storage devices are encrypted using a first of the plurality of encryption keys, and wherein messages sent between the first of the plurality of virtualized volumes and a second of the two or more physical storage devices are also encrypted using the first encryption key, wherein the secure messaging manager is further configured to encrypt the message to one of the plurality of virtualized volumes using the one of the plurality of public keys related to the one of the plurality of virtualized volumes.

5. The networked storage system of claim 4, wherein each of the plurality of virtualized volumes is configured to store data on more than one of the plurality of physical storage devices.

6. The networked storage system of claim 4, further comprising a network controller configured to store a mapping between the plurality of virtualized volumes to the plurality of encryption keys.

7. The networked storage system of claim 4, wherein the secure messaging manager is configured to establish a handshake with one or more of a plurality of drives using pre-shared keys (PSKs).

8. The networked storage system of claim 4, wherein the secure messaging manager is configured to establish a handshake with one or more of a plurality of drives using certificates (CERTs).

9. A networked data storage system, comprising:
  a plurality of virtualized volumes distributed across two or more of a plurality of physical storage devices, messaging with each of the plurality of virtualized volumes being encrypted using a different key for each of the plurality of virtualized volumes, wherein messages sent between a first of the plurality of virtualized volumes and a first of the two or more physical storage devices are encrypted using a first encryption key, and wherein messages sent between the first virtualized volume stored and a second of the two or more physical storage devices are also encrypted using the first encryption keys;
  a secure messaging manager configured to receive a request from a client to store data to a network resource comprising a plurality of virtualized volumes and to determine an identity of a target virtualized volume; and
  a key store configured to store a plurality of encryption keys, each of the plurality of encryption keys relating to messaging with one of the plurality of virtualized volumes.

10. The networked data storage system of claim 9, wherein the key store is a local key store configured with the secure messaging manager.

11. The networked data storage system of claim 9, wherein the key store is configured remotely from the secure messaging manager.

12. The networked data storage system of claim 9, wherein each of the plurality of virtualized volumes is configured to store data on a plurality of physical storage devices.

13. The networked data storage system of claim 12, wherein the secure messaging manager is further configured to establish a handshake with each of the plurality of physical storage drives using pre-shared keys (PSKs).

14. The networked data storage system of claim 12, wherein the secure messaging manager is further configured to establish a handshake with each of the plurality of physical storage drives using certificates (CERTs).

* * * * *